(12) United States Patent  
Avadhanam

(10) Patent No.: US 8,875,163 B2  
(45) Date of Patent: Oct. 28, 2014

(54) PRIVACY APPLICATION AND METHOD

(75) Inventor: Phani Bhushan Avadhanam, San Diego, CA (US)

(73) Assignee: Qualcomm Innovation Center, Inc., San Diego, CA (US)

(*) Notice: Subject to any disclaimer, the term of this patent is extended or adjusted under 35 U.S.C. 154(b) by 147 days.

(21) Appl. No.: 13/461,386

(22) Filed: May 1, 2012

(65) Prior Publication Data  
US 2013/0298138 A1   Nov. 7, 2013

(51) Int. Cl.  
G06F 9/44 (2006.01)  
G06F 17/00 (2006.01)  
G06F 17/30 (2006.01)

(52) U.S. Cl.  
USPC .................................. 719/328; 726/1; 726/26

(58) Field of Classification Search  
None  
See application file for complete search history.

(56) References Cited

U.S. PATENT DOCUMENTS

| | | | |
|---|---|---|---|
| 2010/0024020 A1* | 1/2010 | Baugher et al. | 726/7 |
| 2010/0024028 A1* | 1/2010 | Baugher et al. | 726/17 |
| 2010/0242110 A1* | 9/2010 | Louch et al. | 726/22 |
| 2010/0275266 A1* | 10/2010 | Jakobson et al. | 726/26 |
| 2011/0265187 A1* | 10/2011 | Li | 726/27 |
| 2011/0321167 A1* | 12/2011 | Wu et al. | 726/26 |
| 2012/0005720 A1* | 1/2012 | McGloin et al. | 726/1 |
| 2012/0102577 A1* | 4/2012 | Kurien et al. | 726/30 |
| 2012/0192247 A1* | 7/2012 | Oliver et al. | 726/1 |
| 2012/0222083 A1* | 8/2012 | Vaha-Sipila et al. | 726/1 |
| 2012/0260118 A1* | 10/2012 | Jiang et al. | 713/340 |
| 2013/0232573 A1* | 9/2013 | Saidi et al. | 726/22 |

* cited by examiner

Primary Examiner — Charles E Anya  
(74) Attorney, Agent, or Firm — Neugeboren O'Dowd PC

(57) ABSTRACT

A computing device comprising an operating system comprising one or more operating system features, a plurality of applications and a background service. A first of the plurality of applications is adapted to create one or more privacy groups and associate a remainder of the plurality of applications with at least one of the one or more privacy groups. The background service is adapted to (i) communicate with the first of the plurality of applications and the one or more operating system features, and (ii) associate at least one of the remainder of the plurality of applications and one of the one or more privacy groups with the one or more operating system features.

15 Claims, 4 Drawing Sheets

PRIVACY APPLICATION AND METHOD

BACKGROUND OF THE INVENTION

1. Field of the Invention

This invention relates to application privacy. Specifically, but not intended to limit the invention, embodiments of the invention are related to managing data transmission to, from, and between computing device software applications.

2. Relevant Background

When operating a computing device such as, but not limited to, a touch-screen mobile computing device, it may be desired to use one or more applications associated with the device. During the installation and use of such applications, a user may be informed or may otherwise determine that such applications share information with other applications or with other computing device features. If such sharing of information is not critical to the use of the application, or if the user does not wish to share various types of information, the user may wish to cease or otherwise modify such sharing of information.

SUMMARY OF THE INVENTION

Illustrative embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents, and alternative constructions that fall within the spirit and scope of the invention as expressed in the claims.

One embodiment of the invention comprises a computing device comprising an operating system, a plurality of applications and a background service. The operating system comprises one or more operating system features. A first of the plurality of applications is adapted to create one or more privacy groups and associate a remainder of the plurality of applications with at least one of the one or more privacy groups. The background service is adapted to communicate with the first of the plurality of applications and the one or more operating system features. The background service is further adapted to associate at least one of the remainder of the plurality of applications and the one or more privacy groups with the one or more operating system features.

Another embodiment of the invention comprises a computing system comprising a means for establishing one or more privacy groups, a means for associating one or more applications, one or more data types, and one or more operating system features with the one or more privacy groups, and a means for configuring the one or more privacy groups to at least one of allow and restrict the flow of information to and/or from the applications associated with the one or more privacy groups. The computing system further comprises a means for requesting the information and a means for responding to the information request.

Yet another embodiment of the invention comprises a method of determining whether information may be sent from a computing device application. One method comprises creating one or more privacy groups, associating at least one of the computing device application and a data type with the one or more privacy groups, requesting to access information associated with the computing device application, and determining whether the information may be accessed. The method further comprises one of providing the information and providing a notice the information cannot be provided.

And yet another embodiment of the invention comprises a non-transitory, tangible computer-readable storage medium, encoded with processor-readable instructions to perform a method of operating application privacy settings on a computing device. One such method comprises launching a privacy application displaying at least one of, computing device applications, and data associated with the applications, and prompting a user to place at least one of the applications and the data into groups based on one or more privacy settings. The method may further comprise identifying one or more operating system features associated with the at least one of applications and data.

BRIEF DESCRIPTION ON THE DRAWINGS

DETAILED DESCRIPTION

Figure 1:
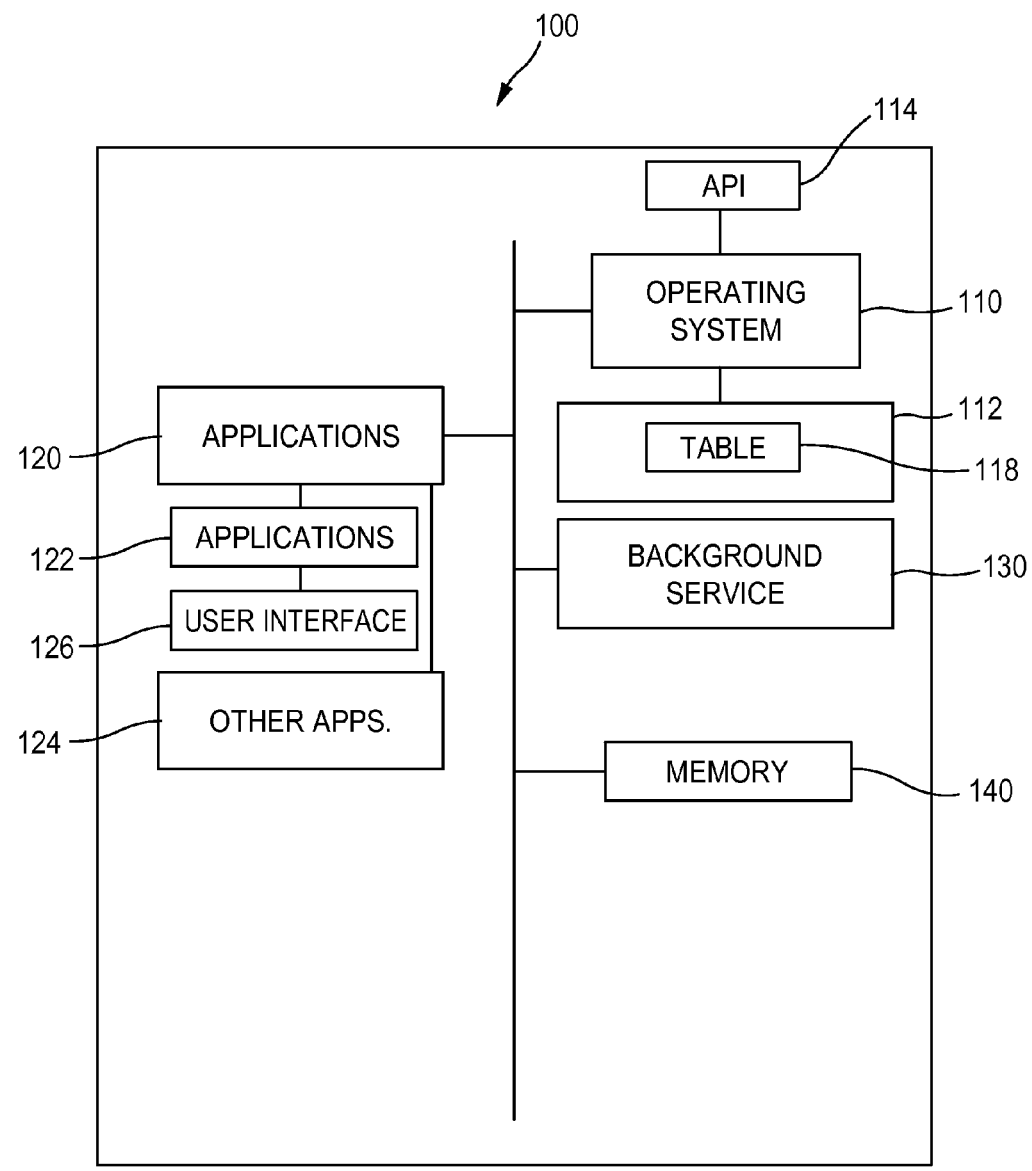
FIG. 1 illustrates a block diagram depicting components of a computing device.
Figure 3:
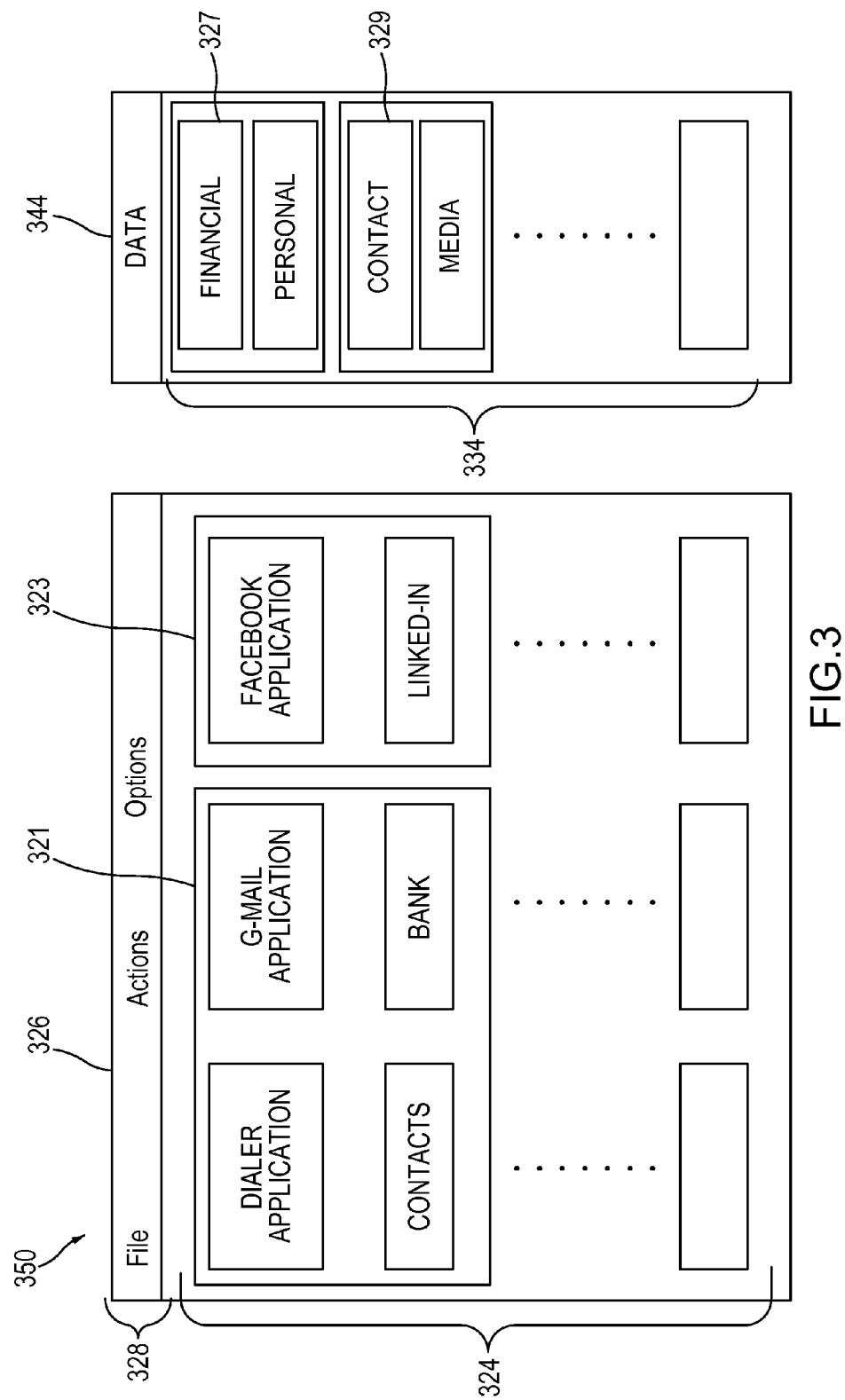
FIG. 3 illustrates components of a privacy application user interface.

Looking first at FIG. 1, seen is a computing device 100 comprising an operating system 110, a plurality of applications 120, and a background service 130. A first of the plurality of applications may comprise a privacy application 122. Upon launching the privacy application 122 on the computing device 100, a user interface 126 may be displayed. One example of a user interface 326 is seen in FIG. 3, although any other user interface 326 described herein or known in the art may be used. It is contemplated that although the various features of the computing device 100 shown in FIG. 1 are separate, FIG. 1, and every other figure, is merely exemplary and the actual implementation of the features shown in FIG. 1 and the other figures may vary.

In one embodiment the privacy application 122 may enable a user to create one or more privacy groups. A privacy group may comprise a configuration for enabling or restricting the flow of information and/or information types to or from any applications associated with the privacy group. It is contemplated that although the term "information" is used in this example to describe the functionality of a privacy group, the term "data" may also be used to describe the privacy group and privacy application 122 functionality throughout the specification. Such terms may be used interchangeably, where appropriate.

In one embodiment, a user may create a first privacy group having a first privacy setting. The first privacy setting may comprise restricting the flow of a first information type from any applications 120 associated with the first privacy group. In one embodiment, the first information type may comprise financial information. The privacy application 122 may automatically provide the information types associated with each application assigned to the privacy group or located on the device 100 or a user may identify the information types. Additional information types include personal information such as, but not limited to home address, phone number, social security number. Other types of information used by applications are also contemplated. In one embodiment, a first privacy group may also allow the flow of personal information from any applications 120 associated with the group. A second privacy group having a second privacy setting may restrict the flow of all information from the applications 120. Alternative privacy settings are contemplated which may restrict the flow of information to any applications 120 assigned to the group. Additionally, and as disclosed below, one or more privacy settings may involve restricting or allowing the use of various memory 140 devices.

Upon creation of the privacy groups and privacy settings, a user may use the user interface 126 to place one or more of a remainder 124 of the plurality of applications 120 not including the privacy application 122 into one or more of the privacy groups. The remainder 124 of the plurality of applications 120 may also be referred to as other applications 124. To place the one or more of the remainder 124 of applications 120 in a privacy group, in one embodiment, the user interface 126 may display a list of the applications 120 installed on the computing device 100 and the user may separate the applications 120 by, for example, drawing one or more horizontal and/or or vertical lines separating the list into two or more sections. The user may then assign each section to a privacy group by double-tapping on the screen within each section, or by performing another gesture or selecting a specific menu option. Alternatively, the user may draw circles around groups of applications 120 and assign the applications 120 in the circle to a privacy group in a similar manner. The user may also place each application 120 into a privacy group individually by selecting the application on the user interface, or may place the applications 120 into a group by assigning an application type to each application such as, but not limited to, financial, gaming, etc. and then assigning each application type to a specific privacy group. Upon placing the applications 120 into one or more privacy groups, the user may modify the group each application 120 is associated with and or may modify the privacy group settings. However, such modification may induce one or more alert notifications, as described below.

The background service 130 may be initiated upon launching the privacy application 122. One background service 130 may be adapted to communicate with the other applications 124 via the privacy application 122 and with one or more operating system features 112. For example, the background service 130 may comprise an abstraction layer on the operating system 110 that communicates with the operating system features 120 via one or more APIs 114 and with the privacy application 122 via one or more wrapper APIs 114.

In receiving information from the privacy application 122, the background service 130 may at least one of enable and disable aspects of one or more operating system features 112 by limiting the flow of various types of information to the other applications 124. As described below, which features 112 are enabled and which information types may be sent to/from the various applications 124 may be stored in a table 118 whose data is controlled by the background service 130, as set by a user of the privacy application 122.

In one embodiment, the background service 130 may store data related to the applications 120 in one or more memory locations 140. The one or more memory locations comprise may comprise RAM, ROM, NVM, DVD/CD-ROM, SD card, etc. The data related to the applications 124 may be information received from the privacy application 122 and information received from the operating system 110. For example, the background service 130 may create the one or more tables 118 and insert into the tables 118 data comprising an application identifier such as, but no limited to, an application name. Associated with the identifier may be one or more operating system constructs such as, but not limited to, a process identifier such as a process i.d. A privacy setting as set by the user in the privacy application 122 may also be associated with the other applications 124 in the table 118. The privacy setting may be associated by the background service 130 to allow and restrict various types of data with the application 124 and to enable, disable operating system features 112 for the application 124.

In one embodiment, through receiving information from the privacy application 122, the background service may establish which memory 140 portions the application 124 may access—for example, whether the application 124 may share information dynamically on the memory heap, share information on the RAM while the application is running, access information on an SD (static data) Card, and/or whether the application 124 will have full memory access for information on the data partition(s). Other operating system features 112 comprising constructs may further comprise whether the application 124 does or does not operate as a sandbox application or a state-based application.

In such a manner, the background service 130 is adapted to associate the remainder 124 of the plurality of applications 120 with one or more operating system features 112, at least one of the one or more privacy groups, and restricting or allowing the flow of information or various data types with the applications 120. The background service 130 is further adapted to communicate with the first of the plurality of applications comprising the privacy application 122 through wrapper APIs 114 and the one or more operating system features 112 through operating system APIs 114.

Figure 2:
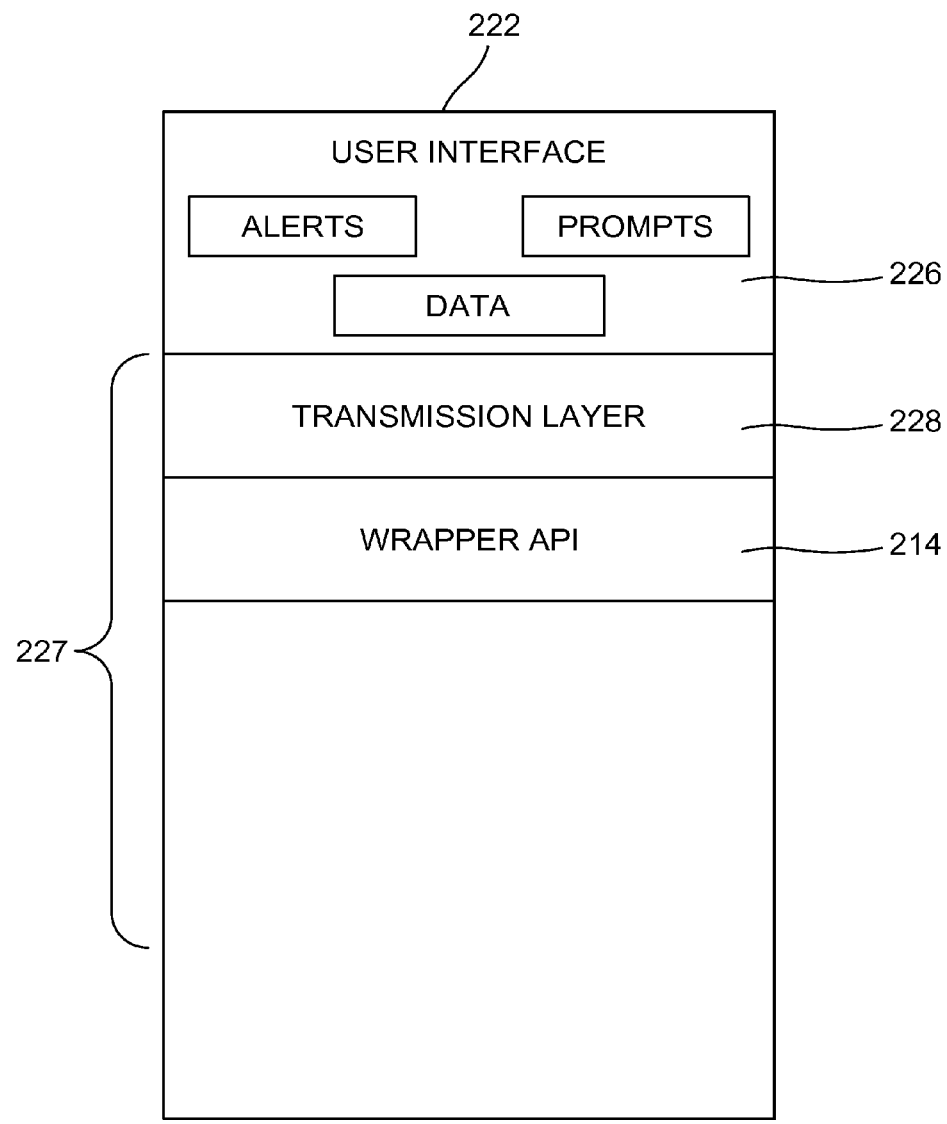
FIG. 2 illustrates a block diagram depicting a privacy application.

Turning now to FIG. 2, seen is a representation of the layers within a privacy application 222. One privacy application 222 comprises a user interface layer 226. The user interface layer 226 may comprise alerts and prompts that are issued to ensure the accuracy of various settings established by the user limiting and enabling various types of data. For example, if the user has requested to share one type of information from the application 124 that the privacy application 222 has determined includes secure information, the privacy application may required the user to verify the user wishes to share this information. One such information type may comprise financial information from a bank application 124. Various types of data may be associated by the user interface 226 each application listed in the user interface 226 and the user may enable or disable the sending and/or receiving of such data types through the use of a drop-down box, radial button, or other methods known in the art. Such implementation of data types may be established through implementing one or more rules through the user interface 226. The user interface 226 may also be adapted to establish rules or otherwise control the flow of specific data types. For example, a user may be adapted to set an application-wide rule that any application 124 comprising financial information is not allowed to share that information with any other application 124.

A user interface 226 may be further adapted to enable a user to see/list the established privacy groups and what rules, data, and applications 124 are associated with each group. The user interface 226 may display applications by their application identifier and/or as an icon, etc. Selection one or more menu options may enable various privacy application features. Furthermore, and as described above and below, the user interface 226 may display selected application information by receiving information from the background service 130 through the APIs 114, as described in FIG. 1.

Translating information stored by the background service 130 to the user interface 226 may be enabled by an application translation layer 228. The translation layer 228 may comprise a portion of a framework 227. The wrapper APIs 214 may also comprise a portion of the framework 227. As described before, the APIs 214 may work with the background service 130 to maintain operating system specific data structures comprising the operating system features 112. One type of data structure is the table 118 described above. One table 118 may comprise a plurality of tables 118.

In one embodiment, the background service 130 may enable and disable the one or more operating system features 112 and may list the features 112 in the table 118. The features 112 may comprise at least one of, a feature operating on the kernel, one or more operating system process identification numbers, a sandboxing security mechanism, one or more memory devices, one or more memory partitions, and an application executable file. The one or more data structures may be stored by the background service 130 in a computing device non-volatile memory.

The one or more data structures may be accessed through one or more GET/PUT functions from the background service 130 or otherwise. In one embodiment, the one or more GET/PUT functions may comprise parameters comprising at least one of an application ID parameter and a privacy group identifier. Data from the data structures may be returned to the privacy application 122.

In one embodiment, the background service 130 is adapted to communicate with the operating system 110 through the QPIs 114 by sharing information between operating system processes. The background service 130 may also be adapted to communicate with first of the plurality of applications translation layer 228 with the translation layer 228 being adapted to enable the information sent by the background service 130 to be displayed by the user interface 126. For example, the translation layer 228 may modify the received information and send the modified information to an application layer comprising the user interface 226. The background service 130 may be launched by the privacy application 122.

Turning now to FIG. 3, seen is another embodiment of the invention comprising a computing system 350. One computing system 330 comprises a user interface 326. In one embodiment, the user interface 326 may comprise a means for establishing one or more privacy groups. For example, a user may choose a menu selection 328 and the menu selection 328 may provide an option for creating one or more privacy groups. The user may then configure the one or more privacy groups to at least one of allow and restrict the flow various information types to and/or from the one or more privacy groups. In order to determine whether data may be enable for an application 324, the privacy application 122 may determine the types of data 334 associated with each particular application 324. Alternatively, the user may associate various types of data with the application 324. Still further alternatively, the user or the privacy application 122 may determine or set the types of data 334 that are used by all the applications and list those in a data menu 344.

Upon choosing to create the one or more privacy groups, one or more applications 324 or data types 334 may be associated with the one or more privacy groups. Seen in FIG. 3 is a first privacy group 321 and a second privacy group 323. Additionally, the computing system 350 may further comprise means for requesting the data 334 associated with the application and means for responding to the request. In configuring the first privacy group 321 and second privacy group 323 to at least one of allow and restrict the flow of information to and/or from the privacy groups 321, 323, one embodiment may comprise associating metadata with the operating system data sent from the background service 130. For example, in requesting to view privacy group data, at least one of the user interface and the background service may determine whether the information may be accessed and, if so, a cookie comprising the metadata may be received by the user interface 326.

Also seen in FIG. 3 is a first data privacy group 327 and a second data privacy group 329. The data privacy groups 327, 329 may be enabled or disabled for various applications 324. Like the application privacy groups 321, 323 where the user may manually assign types of data 334 to the groups 321, 323, the system 350 may automatically assign types of data 334 to align with general settings as established by the user (e.g. "financial" security group setting, "business" security group setting, "personal" security setting, etc.), the user may also manually assign various applications 324 to the data privacy groups 327, 329 in a similar manner. In requesting information associated with the applications 324 or data 334, the request may be initiated via an interface associated with the application 324. The request may be processed by the background service 130 which implements the privacy group settings as established through the user interface 326. The background service 130 then determines whether the data may be sent to the requested application 324. If so, the requested data is sent from the background service 130 to the application 324.

Figure 4:
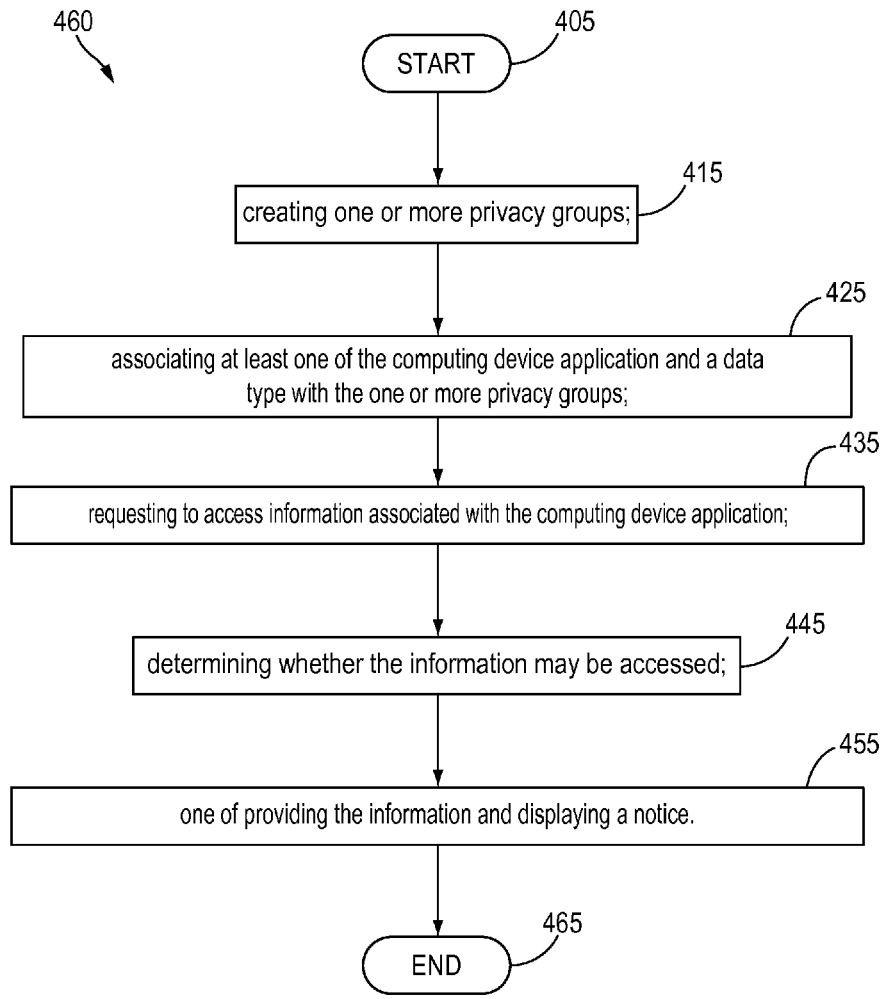
FIG. 4 illustrates a flowchart that depicts a method that may be carried out in connection with the embodiments described herein.

Turning now to FIG. 4, seen is a method 460 of determining whether to provide information. One method 460 starts at 405 and at 415 comprises creating one or more privacy groups. In one embodiment, the one or more privacy groups may comprise the application privacy groups 321, 323 and/or the data privacy groups 327, 329 seen in FIG. 3. At 425 the method 460 comprises associating one of an application and a data type with the one or more privacy groups. This operation is explained above with reference to FIGS. 1-3. At 435 the method 460 comprises requesting to access information associated with the one of an application and a data type. This is further disclosed above and comprises operating the application 324 through a user interface associated with the application 324 to request data 334 associated with the application (i.e., financial information associated with a banking application) or otherwise accessing the data 334. At 445 the method 460 comprises determining whether the information may be accessed. This step comprises, as described elsewhere, determining at the background service 130 the privacy group setting, as established by the privacy application 122, that is associated with the data. At 455 if the background service 130 determines that the privacy setting allows the data to be transferred to/from the application 324, the data 334 is transferred or, if the privacy setting associated with the data/application prevents the data from being sent, a notice is provided to the user that the information cannot be provided. At 465 the method 460 ends.

As described above, in one embodiment, the method 460 step of 425 comprising associating one of an application 324 and a data type 334 with the one or more privacy groups may comprise launching a privacy application 122, displaying at least one of plurality of additional applications 324 and a plurality of data types 334, and performing a gesture to separate the at least one of plurality of additional applications and a plurality of data types into at least two groups. Furthermore, performing a gesture may comprise at least one of drawing a line on a touch screen separating the at least one of plurality of additional applications and a plurality of data types into at least two groups and drawing one or more concentric circles on a touch screen separating the at least one of plurality of additional applications and a plurality of data types into at least two groups. Drawing a line on a touch screen may comprise drawing at least one of, a substantially vertical line, a substantially horizontal line, and a substantially diagonal line.

It is further contemplated that another embodiment of the invention may comprise non-transitory, tangible computer-readable storage medium, encoded with processor-readable instructions to perform a method of operating application privacy settings on a computing device such as, but not limited to the computing device 100 of FIG. 1. One such method of operating application privacy settings comprises launching a privacy application, displaying at least one of computing device applications and data associated with the applications, and prompting a user to place at least one of the applications and the data into groups based on one or more privacy setting. Such a method may further comprise identifying one or more operating system features associated with the at least one of applications and data.

In one embodiment, the groups comprise privacy groups at least one of allowing and preventing one or more data type communication with the applications data associated with the privacy group. The method may further comprise creating the privacy groups before prompting a user to place at least one of the applications and the data into groups based on one or more privacy settings. In one embodiment, identifying one or more operating system features associated with the at least one of applications and data comprises associating with the at least one of applications and data at least one of a process ID, a parent process ID, an application name, and an application executable.

In conclusion, embodiments of the present invention enable a user to limit the types of data shared to and from computing device applications. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A computing device comprising a non-transitory, tangible computer-readable storage medium, encoded with processor-readable instructions wherein at least a portion of the non-transitory, tangible computer-readable storage medium, encoded with processor-readable instructions comprises,
   an operating system comprising one or more operating system features;
   a plurality of applications adapted to at least one of send and receive one or more data types, wherein,
      a first of the plurality of applications is adapted to,
         create one or more privacy groups, and
         associate a remainder of the plurality of applications with at least one of the one or more privacy groups;
   a background service adapted to,
      communicate with,
         the first of the plurality of applications, and
         the one or more operating system features,
      associate at least one of the remainder of the plurality of applications and one of the one or more privacy groups with the one or more operating system features, and
      restrict at least one of the one or more privacy groups from at least one of sending and receiving the one or more data types;
   wherein the first of the plurality of applications comprises a privacy application having,
      an application layer comprising a user interface having at least one of an alert and a prompt mechanism; and
   a framework comprising,
      a translation layer, wherein the translation layer modifies received information for the background service, and
      the background service wherein the background service further includes a wrapper Application Programming Interface (API) for creating and maintaining tables for the plurality of applications;
   wherein, the user interface is adapted to:
   create the one or more privacy groups;
   at least one of transmit and restrict the communication of one or more data types from at least one of the remainder of the plurality of applications and the one or more operating system features; and
   display the remainder of the plurality of applications associated with the one or more privacy groups through accessing the background service.

2. The computing device of claim 1 wherein,
   at least one of the remainder of the plurality of applications and the one or more operating system features are adapted to at least one of send and receive the plurality of data types; and
   the first of the plurality of applications comprises a user interface, the user interface being adapted to,
      create the one or more privacy groups,
      adaptively place the remainder of the plurality of applications in the one or more privacy groups, and
      communicate with the background service to at least one of allow and restrict the one or more privacy groups from at least one of sending and receiving at least one of the plurality of data types.

3. The computing device of claim 1 wherein,
   the background service comprises an operating system abstraction layer adapted to communicate with one or more Application Programming Interface (API); and
   each of the one or more APIs being adapted to at least one of,
      at least one of enable, disable, send, and receive at least one of the plurality of data types to the one or more operating system features, and
      at least one of retrieve data from and send at least one of the plurality of data types to the one or more privacy groups.

4. The computing device of claim 1 wherein,
   the one or more operating system features comprises at least one of,
      a feature operating on the kernel;
      one or more operating system process identification numbers;
      a sandboxing security mechanism;
      one or more memory devices;
      one or more memory partitions;
      an application executable file; and
   the background service is further adapted to one of restrict and allow the communication of one or more data types between the one or more operating system features and the one or more privacy groups.

5. The computing device of claim 1 wherein,
   the one or more operating system features comprise one or more operating system processes; and
   the background service is adapted to communicate with,
      the operating system by at least one of sending and receiving information at least one of to and from the operating system processes, and the translation layer, wherein the translation layer is adapted to,
enable information received from the operating system to be displayed by the user interface, and
send the received operating system information to the user interface.

6. The computing device of claim 1, further comprising,
a computing device non-volatile memory; wherein,
the background service is further adapted to maintain one or more data structures, the one or more data structures being stored in the computing device non-volatile memory; and
at least one of the one or more data structures associates the remainder of the plurality of applications with,
the one or more operating system features, and
the one of the one or more privacy groups.

7. The computing device of claim 6 wherein,
the at least one of the one or more data structures associates the remainder of the plurality of applications with the one or more operating system features by one of restricting and allowing the communication of one or more data types with the one or more operating system features;
information in the one or more data structures is accessed through one or more GET/PUT functions, the one or more GET/PUT functions,
comprise at least one of,
an application identifier (ID) parameter, and
a privacy group identifier; and
return data related to at least one of,
the one or more operating system features,
the one of more data types, and
the one of the one or more privacy groups.

8. A computing system comprising,
means for establishing one or more privacy groups and a background service;
means for associating one or more applications, one or more data types, and one or more operating system features with the one or more privacy groups;
means for configuring the one or more privacy groups and the background service to at least one of allow and restrict the flow of information to and/or from the applications associated with the one or more privacy groups;
means for requesting the information; and
means for responding to the information request; means for creating and maintaining tables for the plurality of applications
the means for configuring the one or more privacy groups to at least one of allow and restrict the flow of information to and/or from the applications associated with the one or more privacy groups comprises, means for modifying the information for the background service;
means for associating metadata with the information;
means for accessing a cookie comprising the metadata upon receiving the request for the information; and
means for determining whether the information may be accessed.

9. The computing system of claim 8, wherein,
the means for requesting the information comprises sending a request from one of the one or more applications for a first data type; and
the means for responding to the information request comprises at least one of,
providing the requested information when the one of more privacy groups associated with at least one of the one of the one or more applications and the first data type is configured to allow the requested information to be accessed;
displaying an alert notification informing the user that the requested information may not be accessed.

10. A method of determining whether information may be sent from a computing device application comprising,
creating one or more privacy groups;
associating at least one of the computing device application and a data type with the one or more privacy groups;
requesting to access information associated with the computing device application; and
using a background service to:
determine whether the information may be accessed; and
one of,
providing the information, and
displaying a notice; modify, by a translation layer, information for one of the plurality of applications; and
create and maintain, by a wrapper Application programming Interface (API), for the plurality of applications
wherein, associating at least one of the computing device application and a data type with the one or more privacy groups comprises,
launching a privacy application,
displaying at least one of a plurality of additional applications and a plurality of data types,
performing a gesture to separate the at least one of plurality of additional applications and a plurality of data types into at least two groups, and
assigning the at least two groups to a previously-created privacy group;
determining whether the information may be accessed comprises, communicating with an Application Programming Interface (API) associated with the at least one of the computing device application and the data type; and
one of providing the information and displaying a notice comprises, one of,
receiving the information from a data structure via,
the API, and
a background service, and
receiving a command from the API to launch a notice informing a user that the information may not be provided.

11. The method of claim 10 wherein, performing a gesture comprises at least one of,
drawing a line on a touch screen separating the at least one of a plurality of additional applications and a plurality of data types into at least two groups; and
drawing one or more concentric circles on a touch screen separating the at least one of plurality of additional applications and a plurality of data types into at least two groups.

12. The method of claim 10 wherein, drawing a line on a touch screen comprises drawing at least one of,
a vertical line;
a horizontal line; and
a diagonal line.

13. A non-transitory, tangible computer-readable storage medium, encoded with processor-readable instructions to perform a method of determining whether information may be sent from a computing device application, the method comprising:
creating one or more privacy groups;
associating at least one of the computing device application and a data type with the one or more privacy groups;
requesting to access information associated with the computing device application; and using a background service to:
determine whether the information may be accessed; and
one of,
providing the information, and
displaying a notice; modify, by a translation layer, information for one of the plurality of applications; and create and maintain, by a wrapper Application programming Interface (API), for the plurality of applications
wherein, associating at least one of the computing device application and a data type with the one or more privacy groups comprises,
launching a privacy application,
displaying at least one of a plurality of additional applications and a plurality of data types,
performing a gesture to separate the at least one of plurality of additional applications and a plurality of data types into at least two groups, and
assigning the at least two groups to a previously-created privacy group;
determining whether the information may be accessed comprises, communicating with an Application Programming Interface (API) associated with the at least one of the computing device application and the data type; and one of providing the information and displaying a notice comprises, one of,
receiving the information from a data structure via,
the API, and
a background service, and
receiving a command from the API to launch a notice informing a user that the information may not be provided.

14. The non-transitory, tangible computer-readable storage medium of claim 13, wherein, performing a gesture comprises at least one of,
drawing a line on a touch screen separating the at least one of a plurality of additional applications and a plurality of data types into at least two groups; and
drawing one or more concentric circles on a touch screen separating the at least one of plurality of additional applications and a plurality of data types into at least two groups.

15. The non-transitory, tangible computer-readable storage medium of claim 13, wherein, drawing a line on a touch screen comprises drawing at least one of,
a vertical line;
a horizontal line; and
a diagonal line.

* * * * *